United States Patent
Kim et al.

(10) Patent No.: US 8,923,383 B2
(45) Date of Patent: Dec. 30, 2014

(54) TRANSMITTER AND TRANSMITTING METHOD USING DELAY LOCKED LOOP

(71) Applicant: Mtekvision Co., Ltd., Seongnam-si, Gyeonggi-do (KR)

(72) Inventors: Eun-Su Kim, Seoul (KR); Dong-Hyun Baek, Seoul (KR); Sang-Yong Park, Seoul (KR); Ju-Young Jung, Seoul (KR); Young-Jin Kim, Goyang-si (KR); Sang-Ah Moon, Goyang-si (KR)

(73) Assignee: Mtekvision Co., Ltd., Seongnam-Si (KR)

( * ) Notice: Subject to any disclaimer, the term of this patent is extended or adjusted under 35 U.S.C. 154(b) by 0 days.

(21) Appl. No.: 13/648,765

(22) Filed: Oct. 10, 2012

(65) Prior Publication Data

US 2013/0094562 A1    Apr. 18, 2013

(30) Foreign Application Priority Data

Oct. 17, 2011    (KR) ........................ 10-2011-0105675

(51) Int. Cl.
  *H03K 7/08*    (2006.01)
  *H03K 9/08*    (2006.01)
  *H04L 25/49*    (2006.01)
  *H04B 5/02*    (2006.01)

(52) U.S. Cl.
  CPC .............. *H04L 25/4902* (2013.01); *H04B 5/02* (2013.01)
  USPC ........................................................ 375/238

(58) Field of Classification Search
  USPC ........................................................... 375/238
  See application file for complete search history.

(56) References Cited

U.S. PATENT DOCUMENTS

| | | | |
|---|---|---|---|
| 2004/0222866 A1* | 11/2004 | Stengel et al. | 332/109 |
| 2006/0022870 A1* | 2/2006 | Zimmerman et al. | 342/464 |
| 2009/0036064 A1* | 2/2009 | Ravi et al. | 455/76 |
| 2012/0153917 A1* | 6/2012 | Adell et al. | 323/283 |
| 2012/0313701 A1* | 12/2012 | Khlat et al. | 330/127 |

FOREIGN PATENT DOCUMENTS

| | | |
|---|---|---|
| KR | 10-2006-0011241 A | 2/2006 |
| KR | 10-2010-0077741 A | 7/2010 |

* cited by examiner

*Primary Examiner* — Tanmay Shah
(74) *Attorney, Agent, or Firm* — Birch, Stewart, Kolasch & Birch, LLP (57) ABSTRACT

An NFC transmitter using a delay-locked loop and an NFC transmission method thereof are provided. The NFC near field communication (NFC) transmitter includes a delay-locked loop (DLL) that outputs a reference clock and a delayed clock using the reference clock and a value of a duty code which are input, a clock output unit that receives the reference clock and the delayed clock, outputs the reference clock in any of a high section and a low section of input data, and outputs a converted clock having a duty ratio using the reference clock and the delayed clock in the other of the high section and the lower section of the input data, and an RF signal generator that generates an RF signal using a PWM (Pulse Width Modulation) signal input from the clock output unit.

10 Claims, 6 Drawing Sheets

TRANSMITTER AND TRANSMITTING METHOD USING DELAY LOCKED LOOP

CROSS-REFERENCE TO RELATED APPLICATIONS

This application is based on and claims priority under 35 USC 119 from Korean Patent Application No. 10-2011-0105675 filed Oct. 17, 2011, which is hereby incorporated by reference in its entirety.

BACKGROUND

1. Technical Field

The present invention relates to a near field communication (NFC) transmitter and an NFC transmission method and more particularly, to an NFC transmitter using a delay-locked loop (DLL) and an NFC transmission method.

2. Related Art

An RFID technique is a kind of near field communication system and is a technique of acquiring information by exchanging data between an IC chip of an object and a terminal through electric waves (RF).

RFID tags can be classified into a type including only a memory device and a type including a CPU device having arithmetic operation capability and are generally widely used for a transportation card, an ID card, an electronic payment card, a distribution management card, and the like.

RFID tags are used to record information on an IC chip built therein or to read information recorded thereon and can be classified into an active or inductively coupled type and a passive or electromagnetic wave type depending on operating power supply systems.

The passive type receives and processes RF waves using a coil antenna and uses the processed RF waves as an operating power source, and has a demerit that the communicable range is short. The active type includes a power source such as a battery therein and the communicable range thereof may be several tens of meters.

As representative solutions in which the RFID technique is applied to a mobile communication terminal, the NFC standard ISO 18092, 14443 (A or B), and the like are standardized and an NFC chip is mounted on a mobile phone and the like. The NFC is a near-field bidirectional data communication technique using 13.56 MHz band which is an HF band and having a communicable range of about 5 cm 10 cm.

The NFC works a card emulation mode in which a mobile phone works like an existing RFID tag and information of a tag built in the mobile phone is recognized when the mobile phone approaches a reader, a reader/writer mode in which the mobile phone serves as a reader or writes personal information or the like to the mobile phone, and a P2P (Peer to Peer) mode in which plural devices communicate with each other.

The NFC can use the existing RFID infra and thus is considered as a communication system which can be easily compatible with the RFID and which has a wide application field.

The NFC is a near field communication system using the HF band and uses an amplitude shift keying (ASK) as a data modulation system. The ASK can be classified depending on the communication speed as described in Table 1.

TABLE 1

ASK Depth depending on Communication Speed

| Communication speed | 106 Kbps | 212 Kbps | 424 Kbps |
|---|---|---|---|
| 14443-A | 100% | 8%~30% | |
| 14443-B | 8%~12% | | |
| 15693 | 100% | | |
| NFC-IP | 100% | 8%~30% | |

Figure 1:
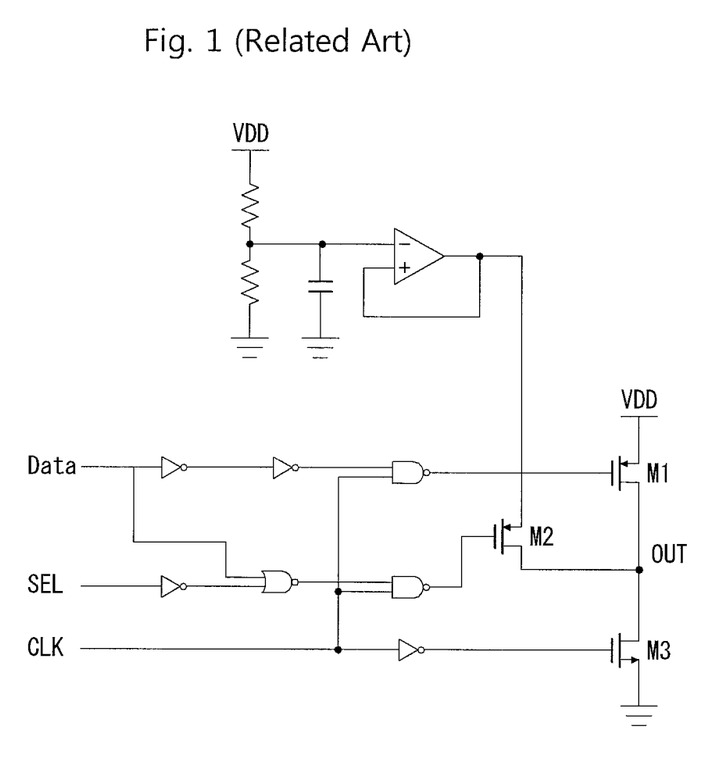
FIGS. 1 and 2 is a circuit diagram illustrating structures of NFC transmitters according to the related art.
Figure 2:
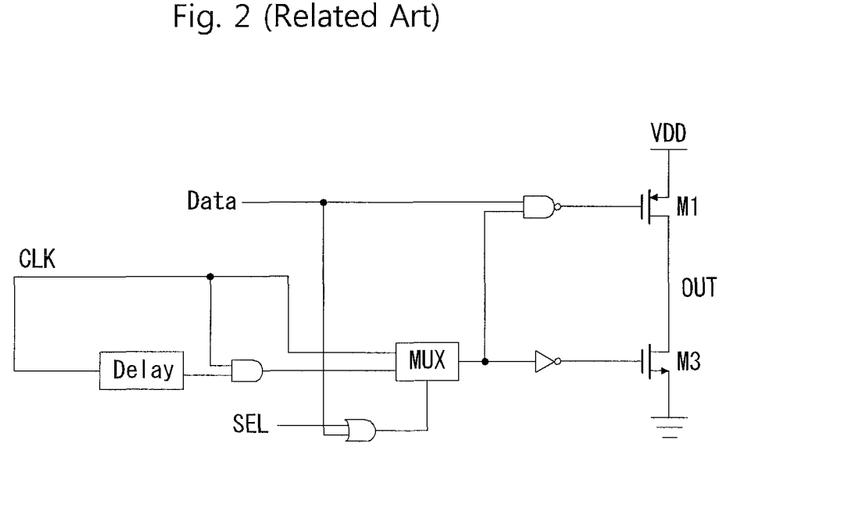

FIGS. 1 and 2 are circuit diagrams illustrating structures of NFC transmitters according to the related art. FIGS. 1 and 2 show systems that control VDD to implement an ASK modulation.

In the structure of the transmitter shown in FIG. 1, only 100% ASK and 10% ASK can be designated as modulation depths. When the transmitter operates at the ASK depth of 100%, M1 and M3 output VDD to GND like an inverter. When the transmitter operates at the ASK depth of 10%, M2 is turned on and M1 and M3 output VDD to the source voltage of M2. The transmitter structure shown in FIG. 1 is disclosed in Kyung-won Min, Suk-Byung Chai, and Shiho Kim, "An analog Front-End Circuit for ISO/IEC 14443-Compatible RFID interrogators", ETRI Journal, Volume 27, Number 6, December, 2004.

In the structure of the transmitter shown in FIG. 2, a clock CLK and a clock CLK with a deformed duty ratio are input to the MUX. When the transmitter operates at the ASK depth of 100%, the clock CLK is used. However, when the transmitter operates at the ASK depth of 10%, the clock with a deformed duty ratio is used. The structure of the transmitter shown in FIG. 2 is disclosed in Jung-hyun Cho, Jikon Kim, Jae-Whan Kim, Kyunil Lee, Kwang-Duk Ahn, and Shiho Kim, "An NFC transceiver with RF-powered RFID transponder mode," IEEE Asian Solid-State Circuits Conference, Jeju, Korea, Nov. 12-14, 2007.

However, the NFC transmitters according to the related art have a problem in that it is difficult to implement the ASK having various modulation depths.

Specifically, in the structure of the transmitter according to the related art shown in FIG. 1, current consumption due to a connection structure of VDD and a resistor always occurs to maintain the source voltage of M2 and a large capacitor should be connected to the outside to stabilize the source voltage. There is also a problem in that since the structure is implemented using a method of controlling the VDD voltage and thus the resistor is much influenced by a variation in PVT (Process, Supply Voltage, Temperature) due to external circumstances, it is difficult to expect a stable output.

In the transmitter structure according to the related art show in FIG. 2, the delay cell varies very sensitively to the variation in PVT.

Therefore, there is a need for an NFC transmitter in which it is easier to implement an ASK depth and current consumption is smaller and which is less sensitive to a variation in PVT, compared with the NFC transmitters according to the related art.

SUMMARY

An advantage of some aspects of the invention is that it provides a transmitter using a delay-locked loop in which it is easier to implement an ASK depth and current consumption is smaller and which is less sensitive to a variation in PVT (Process, Supply Voltage, and Temperature) and a transmission method thereof.

Other advantages of the invention will be easily understood from the following description.

According to an aspect of the invention, there is provided a near field communication (NFC) transmitter including: a delay-locked loop (DLL) that outputs a reference clock and a delayed clock using the reference clock and a value of a duty code which are input; a clock output unit that receives the reference clock and the delayed clock, outputs the reference clock in any of a high section and a low section of input data, and outputs a converted clock having a duty ratio using the reference clock and the delayed clock in the other of the high section and the lower section of the input data; and an RF signal generator that generates an RF signal using a PWM (Pulse Width Modulation) signal input from the clock output unit.

The delay-locked loop may include a charge pump that changes a current value to be output using the duty code, a loop filter that converts the current value input from the charge pump into a voltage value and outputs the voltage value, a voltage controlled delay line that outputs the delayed clock which is obtained by delaying the input reference clock in accordance with a voltage control signal, and a phase/frequency detector that inputs an up signal or a down signal to the charge pump on the basis of the comparison result of the reference clock and the delayed clock in phase and frequency.

The duty ratio may be in a range of 0% to 49%.

The PWM signal may be a signal having a pulse width corresponding to an amplitude shift keying (ASK) depth of an NFC communication speed.

The RF signal generator may change an output current for transmitting the data to any value of 10 mA to 60 mA using a power code.

According to another aspect of the invention, there is provided a near field communication (NFC) transmission method including the steps of: (a) causing a delay-locked loop to output a reference clock and a delayed clock using the reference clock and a value of a duty code which are input; (b) causing a clock output unit to receive the reference clock and the delayed clock, to output the reference clock in any of a high section and a low section of input data and to output a converted clock having a duty ratio using the reference clock and the delayed clock in the other of the high section and the lower section of the input data; and (c) causing an RF signal generator to generate an RF signal using a PWM (Pulse Width Modulation) signal input from the clock output unit.

The step of (a) may include causing a charge pump to change a current value to be output using the duty code, causing a loop filter to convert the current value input from the charge pump into a voltage value and to output the voltage value, causing a voltage controlled delay line to output the delayed clock which is obtained by delaying the input reference clock in accordance with a voltage control signal, and causing a phase/frequency detector to input an up signal or a down signal to the charge pump on the basis of the comparison result of the reference clock and the delayed clock in phase and frequency.

The duty ratio may be in a range of 0% to 49%.

The PWM signal may be a signal having a pulse width corresponding to an amplitude shift keying (ASK) depth of an NFC communication speed.

The RF signal generator may change an output current for transmitting the data to any value of 10 mA to 60 mA using a power code.

Other aspects, features, and advantages of the invention will become apparent from the accompanying drawings, the appended claims, and the detailed description.

According to the aspects of the invention, it is possible to easily implement an ASK depth, to reduce current consumption, and to make the transmitter to be less sensitive to a variation in PVT (Process, Supply Voltage, Temperature).

DESCRIPTION OF EXEMPLARY
EMBODIMENTS OF THE INVENTION

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

If it is mentioned that an element is "coupled" or "connected" to another element, it should be understood that the element is directly coupled or connected to another element or still another element is interposed therebetween. On the contrary, if it is mentioned that an element is "directly coupled" or "directly connected" to another element, it should be understood that still another element is not interposed therebetween.

Terms such as "first" and "second" can be used to describe various elements, but the elements are not limited to the terms. The terms are used only to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Terms, "unit", "-er(-or)", "module", and the like, described in the specification mean a unit for performing at least one function or operation and can be embodied by hardware, by software, or by a combination of hardware and software.

In describing the invention with reference to the accompanying drawings, like elements are referenced by like reference numerals or signs regardless of the drawing numbers and description thereof is not repeated. When it is determined that detailed description of known techniques involved in the invention makes the gist of the invention obscure, the detailed description thereof will not be made.

Figure 3:
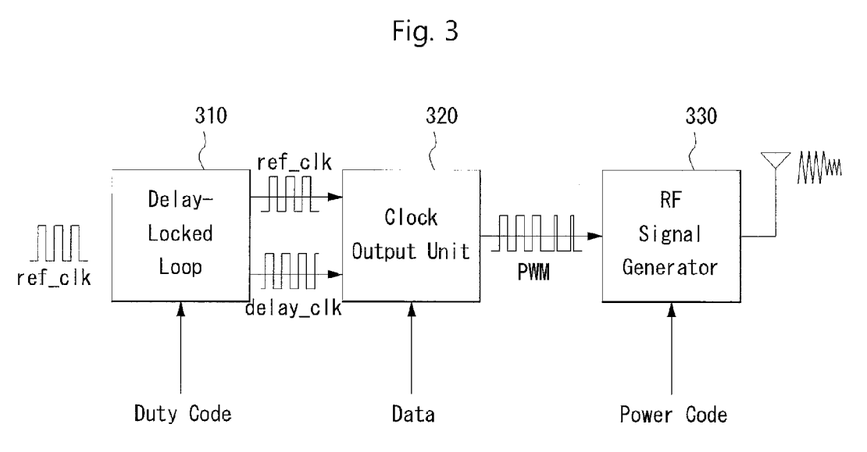
FIG. 3 is a block diagram illustrating the structure of an NFC transmitter according to an embodiment of the invention.

FIG. 3 is a block diagram illustrating the structure of an NFC transmitter according to an embodiment of the invention.

Referring to FIG. 3, the NFC transmitter includes a delayed-locked loop (DLL) 310, a clock output unit (control stage) 320, and an RF signal generator (power stage) 330.

The delay-locked loop 310 outputs a reference clock and a delayed clock delay_clk delayed from the reference clock by a predetermined time on the basis of a value of a duty code for selecting an ASK depth of 0% to 100% using the input reference clock ref_elk.

The clock output unit 320 receives the reference clock and the delayed clock from the delay-locked loop 310, outputs the reference clock in a high section of input data (that is, actual data to be transmitted using a designated communication system), and outputs a converted clock having a duty ratio of 0% to 49%, which is generated using the reference clock and the delayed clock, in a low section of the data.

The RF signal generator 330 generates an RF signal using a PWM (Pulse Width Modulation) signal input from the clock output unit 320. The RF signal generator 330 is configured to change an output current to, for example, a value of 10 mA to 60 mA depending on a power code which is a code for selecting a transmission current for transmitting data.

As shown in FIG. 3, the NFC transmitter according to this embodiment can implement a pulse width satisfying an appropriate ASK (Amplitude Shift Keying) depth corresponding to a communication system and a communication speed by the use of the delay-locked loop 310 and can easily implement various ASK depths from 0% to 100% using such a structure.

Figure 4:
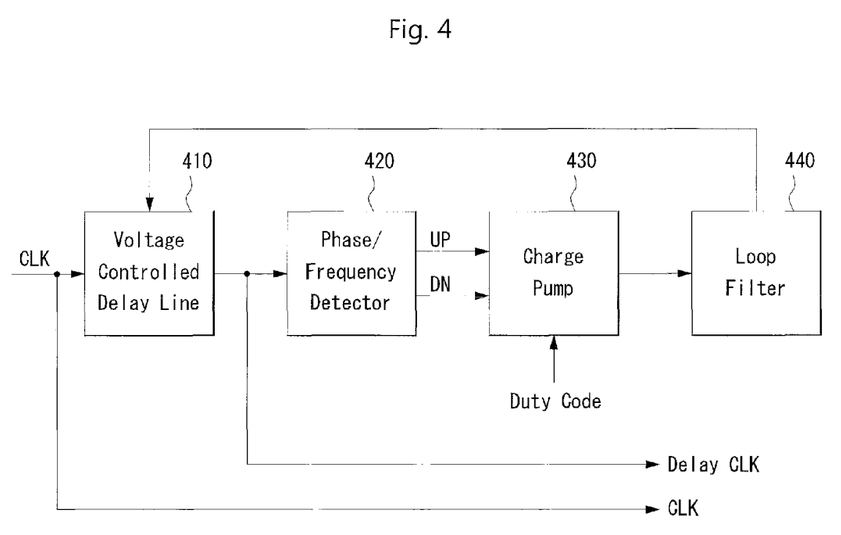
FIG. 4 is a diagram illustrating the configuration of a delay-locked loop (DLL) according to an embodiment of the invention.
Figure 5:
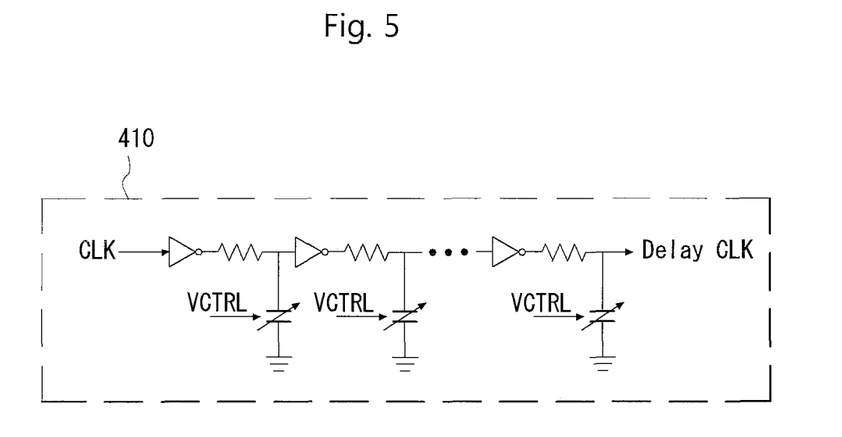
FIG. 5 is a circuit diagram illustrating a voltage controlled delay line (VCDL) according to an embodiment of the invention.
Figure 6:
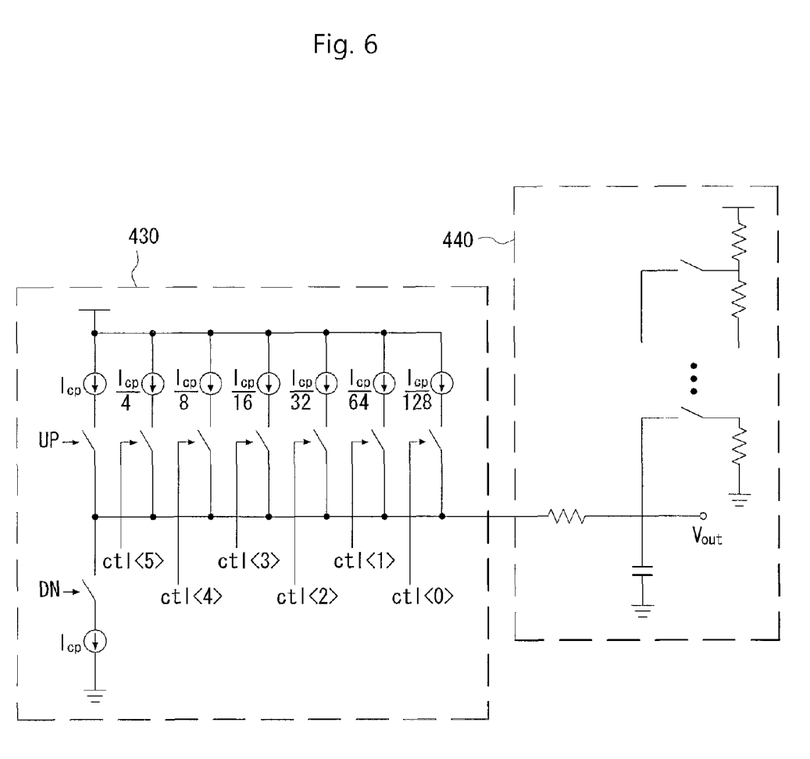
FIG. 6 is a circuit diagram illustrating a charge pump and a loop filter according to an embodiment of the invention.

FIG. 4 is a diagram illustrating the configuration of the delay-locked loop (DLL) according to the embodiment of the invention. FIG. 5 is a circuit diagram illustrating a voltage controlled delay line (VCDL) according to the embodiment of the invention. FIG. 6 is a circuit diagram illustrating a charge pump and a loop filter according to the embodiment of the invention.

Referring to FIG. 4, the delay-locked loop 310 includes a voltage controlled delay line (VCDL) 410, a phase/frequency detector (PFD) 420, a charge pump (CP) 430, a loop filter (LF) 440.

The NFC transmitter according to this embodiment uses the delay-locked loop 310 to implement a PWM system. The delay-locked loop 310 shown in FIG. 1 performs a function of generating a desired delay instead of a function of synchronizing signals as in the related art. Here, the delay-locked loop 310 can generate a desired delay using the duty code of the charge pump 430.

The operations of the delay-locked loop 310 according to this embodiment and the elements thereof will be described below with reference to FIGS. 4 to 6.

The charge pump 430 changes the current input to the loop filter 440 by turning on/off an up current source of the charge pump 430 using a duty code. In this way, the current input to the loop filter 440 is converted into a voltage through the use of the loop filter 440 and is then input to the voltage controlled delay line 410.

The voltage controlled delay line 410 delays and outputs an input clock CLK depending on the voltage value of a voltage control signal (VCTRL) (see FIG. 5).

The delayed clock output from the voltage controlled delay line 410 is input to the phase/frequency detector 420. An up or down signal (see FIG. 6) is input to the charge pump 430 on the basis of the comparison result of the clock CLK and the delayed clock Delay_CLK in phase and frequency.

As described above, one loop can be formed as a result to output a clock with a predetermined delay less sensitive to a variation in PVT (Process, Supply Voltage, Temperature) depending on the duty code.

In this way, the NFC transmitter according to this embodiment can easily realize output waveforms having various ASK depths by implementing a desired ASK depth through the PWM (Pulse Width Modulation) and implementing the pulse width of the PWM using the delay-locked loop. Since the degree of delay is adjusted using a digital code and the delay is corrected using the delay-locked loop, the NFC transmitter is less sensitive to the variation in PVT.

The NFC transmitter according to this embodiment can more easily implement an ASK depth than the NFC transmitter according to the related art and can implement ASK depths of 0% to 100%. Since the NFC transmitter according to this embodiment does not generate a control voltage using a resistor, it is possible to reduce the current consumption. In addition, since a delay is made using the delay-locked loop and is used for the PWM, it is less sensitive to the variation in PVT.

While the invention is described with reference to the embodiments, it will be understood by those skilled in the art that the invention can be modified and changed in various forms without departing from the concept and scope of the invention described in the appended claims.

What is claimed is:

1. A near field communication (NFC) transmitter comprising:
    a delay-locked loop (DLL) that outputs a reference clock and a delayed clock using a value of a duty code and the reference clock which are input;
    a clock output unit that receives the reference clock and the delayed clock, outputs only the reference clock in either of a high logic level and a low logic level of input data, and outputs a converted clock having a duty ratio using both the reference clock and the delayed clock in the other of the high logic level and the low logic level of the input data to generate a Pulse Width Modulation (PWM) signal corresponding to the input data; and
    an RF signal generator that generates an RF signal using the PWM signal input from the clock output unit,
    wherein the delay-locked loop includes:
        a charge pump that changes a current value to be output using the duty code,
        a loop filter that converts the current value input from the charge pump into a voltage value and outputs the voltage value,
        a voltage controlled delay line that outputs the delayed clock which is obtained by delaying the input reference clock in accordance with a voltage control signal, and
        a phase/frequency detector that inputs an up signal or a down signal to the charge pump on the basis of the comparison result of the reference clock and the delayed clock in phase and frequency.

2. The NFC transmitter according to claim 1, wherein the duty ratio is in a range of 0% to 49%.

3. The NFC transmitter according to claim 1, wherein the PWM signal is a signal having a pulse width corresponding to an amplitude shift keying (ASK) depth of an NFC communication speed.

4. The NFC transmitter according to claim 1, wherein the RF signal generator changes an output current for transmitting the data to any value of 10 mA to 60 mA using a power code.

5. The NFC transmitter according to claim 1, wherein the clock output unit pulse-width modulates the input data including the high logic level and the low logic level and generates the PWM signal corresponding to the input data, such that the PWM signal includes a first waveform of the reference clock in a portion corresponding to either of the high logic level and the low logic level and a second waveform of the converted clock in a portion corresponding to the other of the high logic level and the low logic level.

6. A near field communication (NFC) transmission method comprising:
   (a) causing a delay-locked loop to output a reference clock and a delayed clock using the reference clock and a value of a duty code which are input;
   (b) causing a clock output unit to receive the reference clock and the delayed clock, to output only the reference clock in either of a high logic level and a low logic level of input data, and to output a converted clock having a duty ratio using both the reference clock and the delayed clock in the other of the high logic level and the low logic level of the input data to generate a Pulse Width Modulation (PWM) signal corresponding to the input data; and
   (c) causing an RF signal generator to generate an RF signal using the PWM signal input from the clock output unit,
   wherein the step of (a) includes:
      causing a charge pump to change a current value to be output using the duty code,
      causing a loop filter to convert the current value input from the charge pump into a voltage value and to output the voltage value,
      causing a voltage controlled delay line to output the delayed clock which is obtained by delaying the input reference clock in accordance with a voltage control signal, and
      causing a phase/frequency detector to input an up signal or a down signal to the charge pump on the basis of the comparison result of the reference clock and the delayed clock in phase and frequency.

7. The NFC transmission method according to claim 6, wherein the duty ratio is in a range of 0% to 49%.

8. The NFC transmission method according to claim 6, wherein the PWM signal is a signal having a pulse width corresponding to an amplitude shift keying (ASK) depth of an NFC communication speed.

9. The NFC transmission method according to claim 6, wherein the RF signal generator changes an output current for transmitting the data to any value of 10 mA to 60 mA using a power code.

10. The NFC transmission method according to claim 6, wherein the step of (b) includes modulating the input data including the high logic level and the low logic level and generating the PWM signal corresponding to the input data, such that the PWM signal includes a first waveform of the reference clock in a portion corresponding to either of the high logic level and the low logic level and a second waveform of the converted clock in a portion corresponding to the other of the high logic level and the low logic level.

* * * * *